June 27, 1950 — H. E. PAGE — 2,513,044
COMPASS AND INCLINOMETER
Filed Sept. 15, 1945
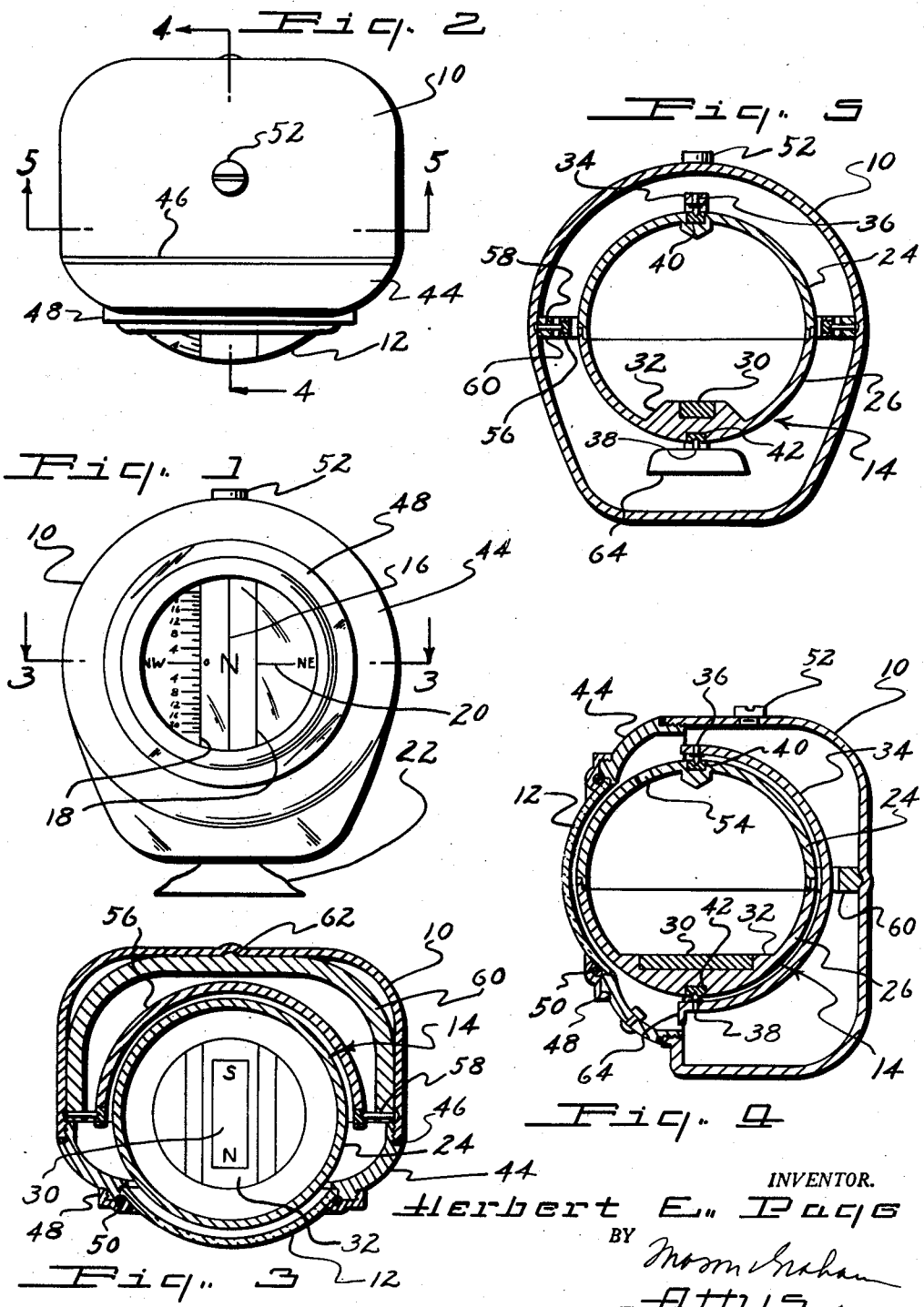
INVENTOR.
Herbert E. Page
BY
Attys.

Patented June 27, 1950

2,513,044

UNITED STATES PATENT OFFICE 2,513,044

COMPASS AND INCLINOMETER

Herbert E. Page, Alhambra, Calif.

Application September 15, 1945, Serial No. 616,521

2 Claims. (Cl. 33—206)

My invention relates to instruments particularly adapted for use in vehicles such as automobiles and specifically to a combined compass and gradometer.

Compasses for use in automobiles are conveniently formed with a compass card in the form of a ball mounted in a housing which may be readily attached to any convenient surface in the automobile such as the dash board or windshield.

Movement of the permanent magnet of the compass causes rotation of the ball about a vertical axis and the pointing of the compass needle may be easily read from markings arranged around the middle of the ball and moving under and across a vertical line placed on a transparent window in the housing.

It is often advantageous to know the gradient on which the automobile is running either upward or downward and it is the general object of my invention to provide an instrument which will indicate the grade as well as incorporating a compass of the kind referred to.

It is an object of the invention to provide a combined compass and gradometer of simple yet sturdy construction for use in vehicles.

It is a further object of the invention to provide a combined compass and gradometer incorporating a liquid filled housing for the purpose of steadying the movement of a ball shaped element which serves both as a compass card and as a grade indicator.

Further objects and features of the invention will appear in the following description taken in conjunction with the accompanying drawings.

The invention is hereinafter described and illustrated in a preferred form, but it is to be understood that the scope of the invention is not in any way limited by this illustrative showing but only as indicated by the scope of the appended claims.

In the accompanying drawings:

Fig. 1 is a face view of the instrument of my invention;

Fig. 2 is a top plan view;

Fig. 3 is a section on line 3—3 of Fig. 1;

Fig. 4 is a section on line 4—4 of Fig. 2, the instrument being shown rotated through 90°; and Fig. 5 is a section on line 5—5 of Fig. 2.

Referring now to Fig. 1 of the drawings, numeral 10 indicates a housing provided with a transparent window 12 through which the markings on a ball 14 may be viewed. A vertical line 16 marked on window 12 serves as a marker from which the compass readings may be taken, while two vertical lines 18 parallel to the line 16 are provided with markings indicating degrees of slope either as percentages of a right angle or in angular degrees and serve to indicate the grade on which the vehicle is moving, a circumferential line 20 passing around the greatest diameter of the ball being read against said markings. The circumferential line will remain horizontal regardless of the slope of the vehicle in its direction of movement, as later explained.

Any suitable means may be provided for supporting the housing 10 in vertical position within the vehicle, a suction cup 22 being shown in Fig. 1. It will be understood that the suction cup might be arranged at the rear of the housing 10 for attachment to a windshield.

The construction of the compass element will be evident from Figs. 4 and 5. The compass card may be formed as a hollow ball comprised of two hemispherical portions 24, 26 secured together in any suitable manner. The lower portion 26 of the ball carries the permanent bar magnet 30 which may be conveniently carried in a slotted bed 32 of a material such as hard rubber mounted in the bottom of the hemispherical portion and therefore well below the horizontal axis of rotation of the ball. The ball is mounted for rotation about a vertical axis in a yoke including oppositely extending arms 34 by means of pins 36 and 38 mounted in the ends of the yoke and engaging in bearings 40, 42 inserted in the wall of the ball. The effort of the bar magnet to always lie in a north-south line will cause the ball shaped compass card to rotate to one side or other as the vehicle deviates from such a line, thereby carrying the points of the compass marked on the circumferential line around the ball past the vertical line 16 and enabling the occupants to note the course followed by the vehicle.

In order to effect the damping of the movement of the compass card, the housing 10 is formed as a fluid container, the body of the housing being formed as a molded or cast box closed by a leak-proof bezel construction. As shown in the drawings, this bezel construction comprises a portion 44 screwed into the housing, a rubber washer being inserted between the edge of the body portion and the portion 44 in order to provide a leak-proof joint.

The domed glass cover 12 is secured to the member 44 in a liquid tight manner by means of a retaining ring 48 screwed to the member 44 and shaped to compress a rubber gasket 50 against the joint between the member 44 and the glass cover 12. Liquid may be poured into the interior of the housing through a hole closed by a threaded stud 52. Preferably the ball is provided with apertures 54 through which the liquid may flow to fill the interior of the ball.

To enable the ball shaped member to function also as a gradometer I provide a construction enabling the ball to rotate about a horizontal axis by providing a second pair of oppositely extending arms 56 on the yoke at right angles to the arms 34. The arms 56 are mounted for rotatable movement about a horizontal axis by pins 58 projecting from a support 60 secured in the housing by projections 62, which may be formed by the heads of the pins at the ends of the yoke arms 56 and which snap into depressions formed in the housing. A further projection at the back of the yoke may be releasably positioned in a depression in the back of the housing. Obviously the support 60 might be secured to the housing in any other suitable manner.

In order to dampen the oscillatory movement of the ball shaped member about the horizontal axis, I provide a vane 64 attached to the lower one of the yoke arms 34. Since this vane is immersed in liquid an efficient damping action is secured. The weight of the permanent magnet and its bed will serve to maintain the ball shaped member normally in vertical position when the vehicle is standing on a horizontal plane with the circumferential line on the ball passing through the zero mark on the grade scale.

It will be evident that I have provided a simple and convenient instrument to indicate both the point of the compass to which the vehicle is headed at any time, and also to indicate the grade on which the vehicle is traveling, which instrument is of simple yet efficient and attractive design.

Although a preferred form of the invention has been particularly shown and described, it is contemplated that various changes and modifications can be made without departing from the scope of the invention and it is intended to cover such changes and modifications as come within the scope of the claims.

I claim:
1. An instrument for attachment in an automobile to indicate direction of travel and inclination of grade, comprising a liquid tight casing, said casing being filled with liquid, a sight window in the wall of said casing, intersecting horizontal and vertical lines on said sight window, a hollow spherical member within said casing, said member being externally marked in terms of polar direction and degrees of grade, a yoke member having one pair of arms pivotally attached at diametrically opposite points to said casing and another pair of arms at right angles to said first pair of arms and pivotally attached at diametrically opposite points to said spherical member, said pivotal connections respectively defining horizontal and vertical axes of rotation for said spherical member, and a bar magnet secured to said spherical member at a point below the horizontal axis thereof and with its longitudinal axis extending in a direction transversely of the vertical axis of the spherical member, said magnet effecting turning motion of said spherical member about said vertical axis in response to changing direction and exerting a stabilizing influence on said member in connection with its rotation about said horizontal axis in response to changing inclination of grade.

2. An instrument according to claim 1, characterized in that said spherical member is formed with openings for the admission of liquid therein and further characterized by a vane extending laterally from said yoke member, the liquid filling said spherical member and said vane cooperating to dampen oscillation of said spherical member about said horizontal axis.

HERBERT E. PAGE.

REFERENCES CITED

The following references are of record in the file of this patent:

UNITED STATES PATENTS

| Number | Name | Date |
| --- | --- | --- |
| 1,726,643 | Borresen | Sept. 3, 1929 |
| 1,984,236 | Smith | Dec. 11, 1934 |
| 2,192,148 | Otto | Feb. 27, 1940 |
| 2,260,396 | Otto | Oct. 28, 1941 |
| 2,300,685 | McKay | Nov. 3, 1942 |